Patented Nov. 6, 1951

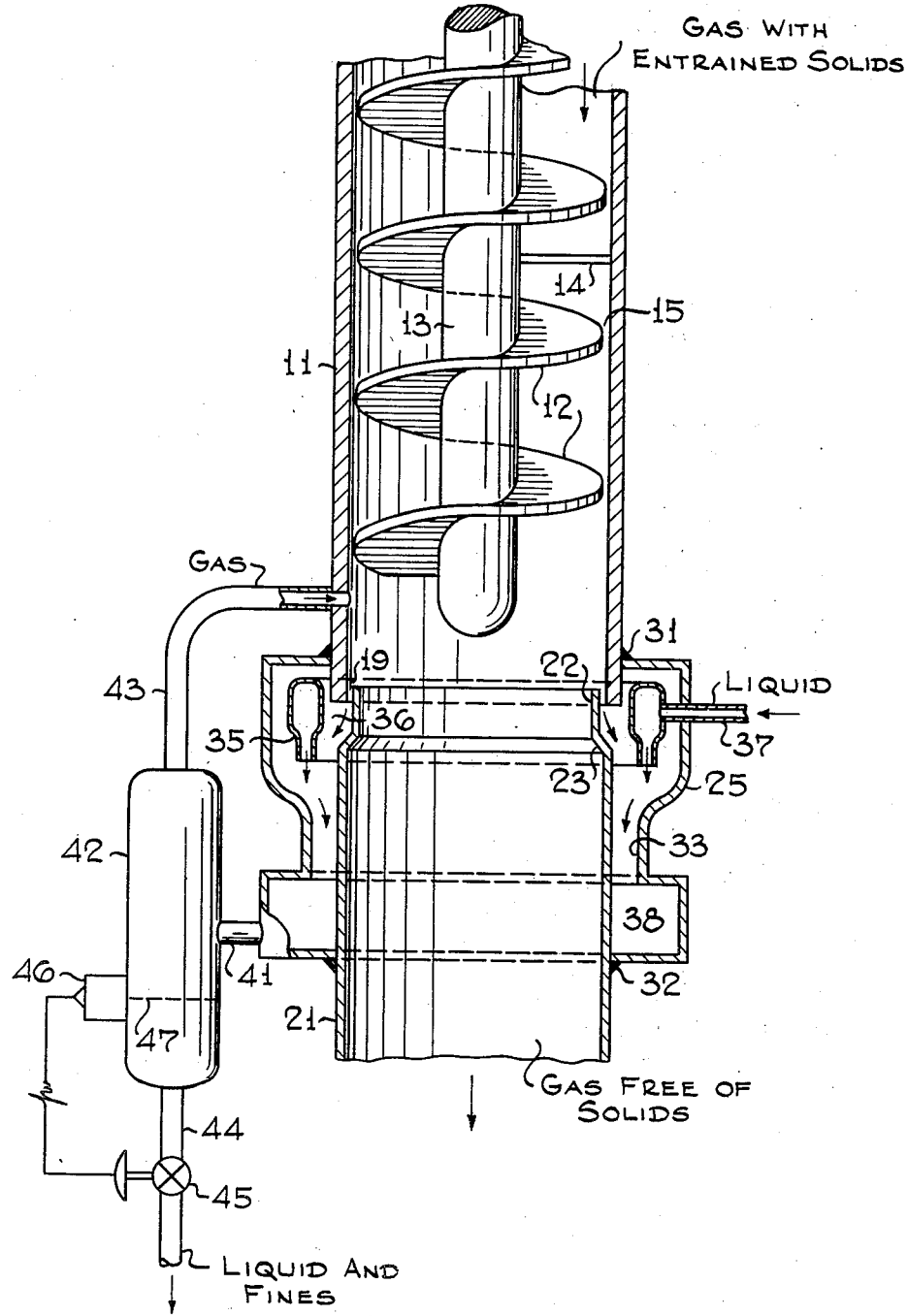

2,574,370

UNITED STATES PATENT OFFICE 2,574,370

EQUIPMENT FOR REMOVAL OF ENTRAINED SOLIDS

Bradford E. Bailey, Elizabeth, N. J., assignor to Standard Oil Development Company, a corporation of Delaware Application June 30, 1948, Serial No. 36,178

4 Claims. (Cl. 183—38)

This invention relates to an apparatus and method for separating solids from fluids and particularly to apparatus for effecting the separation of finely divided solid particles from elastic fluids such as gases and vapors.

Numerous devices have been suggested in the prior art for subjecting a stream of fluids containing solid particles to rotary movement so as to throw the heavier solid matter outwardly and effect a separation. The well known cyclone separators are quite effective for this purpose but they are frequently bulky and must often be used in groups or series to secure the desired completeness of separation. Numerous suggestions have been made in the art for causing a helical movement of fluids passing through a conduit so as to throw the solid matter against the periphery of the conduit where it may be removed in various ways, e. g., by scrubbing the walls with a flowing liquid such as water Thus in the patent to Uehling, U. S. No. 793,110 an upwardly flowing gas is caused to flow with a spiral motion and the solid particles which are driven toward the periphery of the conduit are washed down by a stream of liquid. The patent to Fisher, No. 2,259,031 treats a downflowing gas in a similar manner. In McCurdy patents, Nos. 2,229,860 and 2,343,682, the solid particles removed from an upwardly flowing gas stream are by-passed downwardly through peripheral passageways. The present invention involves specific improvements over the known prior art and avoids some of the faults that have characterized previous apparatus and methods for gas purifications and the like.

It is an object of this invention to secure the advantages of washing the solids out of the system without introducing a liquid into the conduit through which a particle laden gas or vapor is flowing.

A further object is to use the aspirating effect of a washing jet to withdraw solids from a conduit having a helically flowing elastic fluid therein and to reintroduce into the conduit without substantial loss any of such elastic fluid as may be withdrawn in the withdrawal of the solids.

A still further object is to obtain some of the advantages of liquid contact with solids without introducing liquid into the system This avoids subsequent liquid separation or evaporation with attendant requirements for separating equipment, heat consumption, and the like.

Other and further objects will appear as this description proceeds. Reference will next be had to the accompanying drawing wherein an apparatus embodying this invention is illustrated, but it will be understood that the invention is not limited by said drawing, or by the following description, and is intended to cover reasonable and proper equivalents of the various elements and combinations set forth.

In the drawing a gas (or vapor) is shown as flowing downwardly through a suitable conduit or pipe 11. This conduit may be of conventional design, leading from any apparatus or equipment wherein solids are present in the elastic fluid, for example, a catalytic cracking or synthesizing system for hydrocarbons using a finely divided catalytic material entrained in the fluid stream As the fluid stream descends in the conduit 11, it encounters the helical vane structure 12 supported within said conduit, as shown herein, on a central rod or tube 13 fixed with respect to said conduit 11 by any suitable means such as radial supports 14 The vanes 12 may be continuous, as shown or, if desired, they may be discontinuous, so long as they are effective to impart a positive helical or spiral movement to the fluid stream. The angle of the vane or vanes may vary, depending upon the velocity of the fluids through the conduit 11, and depending also upon the diameter of the conduit, which is preferably of circular cross-section. The vanes should be effective to impart a rapid rotary movement to the flowing stream of gas or vapor.

Preferably, as shown in the drawings, the vane structure 12 is mounted in spaced relation with respect to the inner wall of the conduit 11. This space, indicated at 15, is preferably such as to permit free flow of the solid particles along the conduit, but this is not always necessary. The space should not be great enough to interfere substantially with rotary or helical movement of the fluid stream.

At a suitable point conduit 11 is terminated, to provide an annular opening 19, or it may be merely perforated with a series of annularly spaced openings, and another section of conduit 21 is provided with an upper necked portion 22 of slightly smaller diameter than conduit 21 This reduction in diameter may be obtained conveniently by swaging, drawing or rolling a beveled portion 23 and the neck 22. Otherwise, conduit 21 may be identical in size and material with conduit 11.

Surrounding the conduits 11 and 21 at their juncture (or surrounding the band of openings if conduits 11 and 21 are unified) is a Venturi box or collar member 25 which is fixed in fluid tight relation to both conduit elements 11 and 21. As shown, this Venturi box is joined to conduit 11, by welding or by pipe fitting, for example at 31 and to conduit 21 at 32. The precise configuration of the Venturi collar member 25 is not of particular importance except that it is provided with an annular Venturi throat structure 33 of such design and dimensions that an annular jet of washing liquid, supplied through an annular jet structure 35 will create a lower pressure at a point 36 just outside the conduits 11, 21, so as to aspirate the peripheral part of the gas stream from the conduit system. This peripheral part of the gas stream carries the solids which have been separated by centrifugal action.

Liquid, which may be water, hydrocarbon oil, or other suitable material, depending upon the process to which the apparatus is applied, is supplied through a suitable conduit 37 to the annular jet member 35. The jet creates a partial vacuum with respect to pressure in the conduit, withdrawing the solids from the conduit, along with a small portion of the gas or vapor stream. The liquid jet wets the solid particles, washing them downwardly into an enlarged chamber portion 38 of the annular Venturi box or collar member 25. Although the jet is best described as annular, it is not necessarily continuous, though the continuous annular arrangement is preferred.

From the enlarged chamber 38 the liquid and solids, as well as the gases or vapors withdrawn from the main conduit system, are passed through a pipe or other suitable passageway 41 to a receiver 42. The receiver 42 is of sufficient capacity to permit separation of the gas from the liquid slurry of solid particles.

The gas or vapor which separates from the liquid is passed back into conduit 11 through a pipe connection 43. The liquid and solids slurry is drawn off continuously or intermittently from the bottom of receiver 42 through a pipe 44. A valve 45 may be provided to control the draw-off and this may be automatically regulated by an automatic control 46 of conventional design which in turn is under the control of the liquid level in the receiver. The liquid level is indicated by a dotted line at 47.

Where it is not essential that the gases or vapors withdrawn through opening 19 be returned to the system, it is not necessary to provide the receiver 42 and associated parts. The slurry of solid particles in liquid may be withdrawn directly from the collar 33. If needed, a liquid level control valve unit like elements 45, 46 may be installed in pipe 41 and Venturi collar 33.

With the arrangement shown in the drawings, the solids are withdrawn from a downflowing stream of elastic fluids, but in some cases the same arrangement, with minor variations in some instances, may be applied to a stream flowing upwardly or in any other direction. When the direction of flow is changed, the parts should be so arranged that the liquid which collects the solids will pass downwardly through a Venturi passage. Hence for upwardly flowing gas in the main conduits 11 and 21, the Venturi collar 33 and the washing jet ring 35 should preferably retain approximately the positions shown in the drawing, while the conduit assembly 11 and 21 would be inverted.

It will be understood that by injecting liquid into the Venturi zone, but not into the conduit, the disadvantages of excessively cooling the gas stream, or of contaminating said stream by vapors from said liquid, are avoided.

Other alterations and arrangements will suggest themselves to those skilled in the art.

What is claimed is:

1. Apparatus for removing solids from a stream of elastic fluid flowing in a tubular conduit, comprising stationary vane means in said conduit for imparting a rotary movement to said stream to separate said solids from said fluid, an annularly arranged exit in said conduit for removing said separated solids, a Venturi collar surrounding said exit, and means for ejecting an annular jet of liquid into the throat of said Venturi collar to establish a reduced pressure zone outside said exit and withdraw said solids through said exit.

2. Apparatus as in claim 1 wherein means are provided for withdrawing a slurry of liquid and solids from said collar, separating elastic fluids therefrom, and returning said fluids to said conduit.

3. An apparatus for separating solids from a flowing stream of gas which includes a conduit, a fixed vane structure in said conduit for rotating said stream of gas and separating said solids therefrom, an annular opening in said conduit below said vane structure, means guiding said solids into said opening, a Venturi collar outside and surrounding said opening, an annular liquid jet associated in said collar and arranged to aspirate said solids and some incidental gas into said Venturi collar, means for withdrawing said aspirated solids and the liquid of said jet from said collar, liquid level controlled means for separating said liquid and said solids from said gas withdrawn with said solids, and means for returning said gas to said conduit.

4. An apparatus for separating solids from a flowing stream of gas which includes a conduit, a fixed vane structure in said conduit for imparting helical motion to said flowing stream of gas and separating solids therefrom, a second conduit of substantially the same diameter as the first-mentioned conduit, said second conduit being provided with an upper necked portion of slightly smaller diameter than said first-mentioned conduit to form an annular opening with the lower portion of said first-mentioned conduit, a Venturi collar outside and surrounding said annular opening, an annular jet in said collar and arranged to aspirate said solids and some incidental gas into said Venturi collar, a pipe for withdrawing said aspirated solids and incidental gas and the liquid of said annular jet from said Venturi collar, liquid level controlled means communicating with said pipe for separating said liquid and said solids from said gas withdrawn with said solids, a second pipe for returning said separated gas to said first-mentioned conduit above said annular opening and a third pipe for withdrawing said separated liquid and solids from said separating means.

BRADFORD E. BAILEY.

REFERENCES CITED

The following references are of record in the file of this patent:

UNITED STATES PATENTS

| Number | Name | Date |
| --- | --- | --- |
| 1,055,792 | Plock | Mar. 11, 1913 |
| 1,128,177 | Moser | Feb. 9, 1915 |
| 1,496,909 | Schutz | June 10, 1924 |
| 1,513,036 | Donaldson | Oct. 28, 1924 |
| 1,539,797 | Chandler et al. | May 26, 1925 |
| 1,860,238 | Deming | May 24, 1932 |
| 2,474,006 | Maycock | June 21, 1949 |

FOREIGN PATENTS

| Number | Country | Date |
| --- | --- | --- |
| 555,908 | Great Britain | Sept. 13, 1943 |